United States Patent [19]
Broderman et al.

[11] 3,928,431
[45] Dec. 23, 1975

[54] METHOD OF ISOLATING L-DOPA FROM A AQUEOUS SOLUTION THEREOF

[75] Inventors: Thord Broderman; Pentti Hietala; Jacobus Sundman, all of Helsinki, Finland

[73] Assignee: Oy Medica Ab, Helsinki, Finland

[22] Filed: Oct. 15, 1973

[21] Appl. No.: 406,145

Related U.S. Application Data

[63] Continuation-in-part of Ser. No. 377,585, July 9, 1973, abandoned.

[30] Foreign Application Priority Data
July 14, 1972 Finland ............................... 2027/72

[52] U.S. Cl. ................................................. 260/519
[51] Int. Cl.² ........................................ C07C 101/77
[58] Field of Search ..................................... 260/519

[56] References Cited
UNITED STATES PATENTS
2,681,927   6/1954   McCollum et al. ................. 260/519

OTHER PUBLICATIONS
Miller, J. Biol. Chem., Vol. 44, pp. 481–486 (1920).

*Primary Examiner*—James A. Patten
*Attorney, Agent, or Firm*—Hubbell, Cohen, & Stiefel

[57] ABSTRACT

L-dopa is isolated from an aqueous solution thereof by ion exchange with a liquid ion exchanger which is a sulfonic acid dissolved in a suitable organic solvent to form a sulfonic acid salt of L-dopa. The L-dopa is liberated from the salt by neutralization with a base that precipitates the L-dopa. The precipitate is separated from the solution which is regenerated by washing with a mineral acid, the obtained sulfonic acid solution being recycled for further use in isolating L-dopa.

10 Claims, 1 Drawing Figure

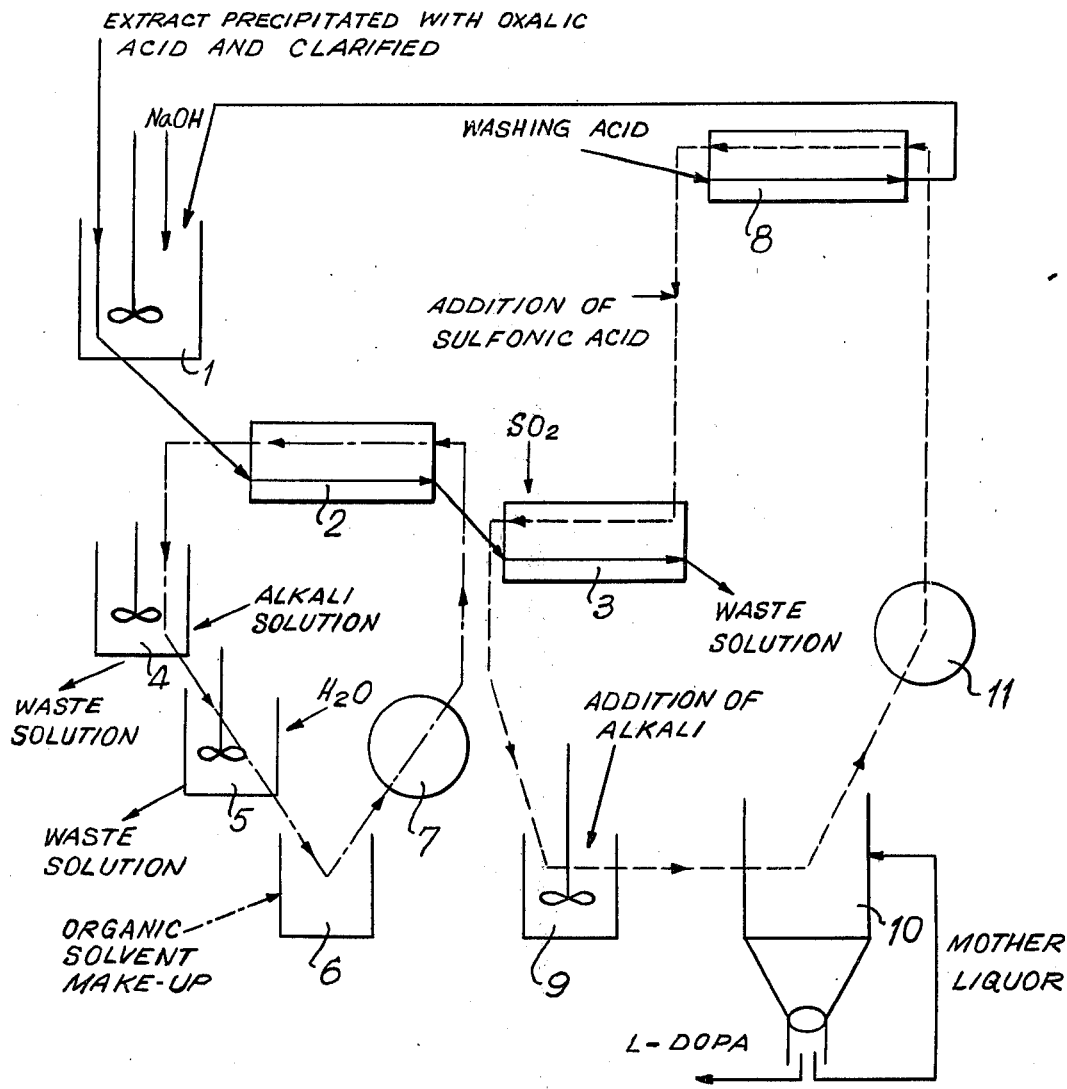

METHOD OF ISOLATING L-DOPA FROM A AQUEOUS SOLUTION THEREOF

CROSS-REFERENCE TO RELATED APPLICATIONS

This is a continuation-in-part of our co-pending application Ser. No. 377,585, filed July 9, 1973, now abandoned.

BACKGROUND OF THE INVENTION

1. Field of the Invention

The present invention relates to processes for the isolation of 3-(3,4-dihydroxyphenyl)-L-alanine (L-dopa) from an aqueous solution thereof.

2. Description of the Prior Art

L-dopa is a compound of relatively common occurrence in biological materials. It is used in the treatment of Parkinson's disease.

According to a known method, L-dopa can be isolated from the ground seeds of certain leguminous plants by extracting the ground up seeds with a dilute sulfurous acid solution followed by adding an excess of lead acetate solution to the extract. The lead acetate precipitates proteins and other impurities from the extract. The precipitate is filtered off and the filtrate is then made slightly alkaline, whereby to precipitate the lead salt of L-dopa. The lead salt of L-dopa is then decomposed by adding hydrogen sulfide.

According to another method for recovering L-dopa from velvet beans (U.S. Pat. No. 3,253,023), the L-dopa is isolated from ground velvet beans by extracting the meal with a 1–10% aqueous solution of an organic acid, the pH of which is 2–6, separating the solution from the insoluble residue, and concentrating the solution in a nitrogen atmosphere. The concentrated solution is then treated with carbon and kieselguhr, filtered, and the filtrate concentrated and cooled for several hours, during which time the L-dopa crystallizes.

Finnish Pat. application No. 2420/71 discloses a method wherein L-dopa is isolated from the extract used as starting material by absorbing it on active carbon, from which it is then eluted onto an ion exchange resin. The L-dopa is displaced from the ion exchange resin with a hydrazine containing ammonia solution. When this solution is neutralized, the L-dopa crystallizes.

A disadvantage of all these previously known methods is that they require the use of active carbon and kieselguhr, which considerably increases production costs. The object of the present invention is therefore to provide a new method, simpler and cheaper than those previously known, for the isolation of L-dopa.

BRIEF DESCRIPTION OF THE DRAWING

The drawing is a flow diagram of the method of the invention showing, in schematic representation, an apparatus for use in performing the method.

SUMMARY OF THE INVENTION

The present invention provides a method of isolating L-dopa from an aqueous solution thereof, irrespective of the source of said aqueous solution. According to the invention, L-dopa is extracted from the aqueous solution with the aid of a liquid ion exchanger. The ion exchanger used in the method is a sulfonic acid dissolved in an organic solvent. As a result of the ion exchange, the L-dopa is bound to the sulfonic acid in the form of a salt, from which it is eventually liberated by neutralizing the solution with a base, which precipitates the L-dopa. The precipitate is separated from the solution, which is then regenerated by washing with a mineral acid solution. The sulfonic acid solution thus obtained is used again for a subsequent extraction of L-dopa.

According to the invention, L-dopa may be isolated from numerous types of extracts or aqueous solutions of biological or other origin. Such extracts or solutions are, for example, a growth solution or culture medium of a microorganism which produces L-dopa as a metabolite; a solution containing L-dopa obtained from a suitable precursor through a biochemical reaction with the aid of a homogenate obtained from animal tissue, plant material, or microbial material; a plant extract, and in particular, a solution obtained by extracting plants or parts of plants of the families Mucuna, Stizolobium, Lupinus, and Vicia, which are known to contain L-dopa; or any solution containing impurities and obtained in the synthetic preparation of L-dopa, regardless of the method.

The sulfonic acid which is used as the ion exchanger, and to which the L-dopa is bound, may be any of a large group of sulfonic acids. The only requirements for the sulfonic acid are that it be one which, when distributed or partitioned between the organic and aqueous phases, favors the organic solvent used. In addition, the sulfonic acid must be capable of forming, together with a suitable base, such as ammonia, hydrazine, alkylamines, such as methyl, ethyl, propyl or butyl amine or alkanolamines, such as methanolamine, ethanolamine, diethanolamine or triethanolamine, a salt that is soluble in the organic solvent used; and also capable of decomposing when washed with an acid, so that the sulfonic acid in the organic solvent is liberated and the liquid ion exchanger is thus regenerated. As examples of suitable sulfonic acids there may be mentioned alkyl- and aryl- sulfonic acids. Of these, a preferred sulfonic acid is dodecylbenzenesulfonic acid, which is inexpensive and readily available. Naphthalene and dibutylnaphthalene sulfonic acids are suitable. Estersulfonic acids may also be used, for example laurylsulfonic acid, which is an ester sulfonate. However, estersulfonic acids are less suitable than the alkyl- and aryl-sulfonic acids because ester sulfonates are slowly decomposed by hydrolysis in acid solutions. Gardinol type detergents (The Merck Index, Eighth ed., 1968), "Teepol" or "Tergitol" may be used.

Suitable organic solvents are alcohols, ketones, and esters which are insoluble or sparingly soluble in water. A preferred organic solvent is methyl-isobutylketone ("hexone"). Other solvents that may be used include: n-butanol, sec. butanol, amyl alcohol, and refined $C_4$–$C_8$ fusel oil, acetonyl acetone, cyclohexanone, methyl ethyl ketone, ethyl acetate and butyl acetate.

If the aqueous solution from which the L-dopa is to be isolated contains calcium, the major portion of the calcium in the solution must be removed, for example by precipitation; with, for example, oxalic acid, before the ion exchange. According to the present invention, if the solution has been treated with oxalic acid to remove calcium therefrom, it is preferable to acidify the L-dopa-containing solution and subject it to a first extraction with the same organic solvent as is used for the ion exchange, but without the use of the sulfonic acid. This first extraction removes impurities which would otherwise accumulate in the liquid ion exchanger and in time hamper the crystallization of L-dopa. The purified aqueous solution obtained in this first extraction after separating the organic solvent still contains the L-dopa. It is then extracted with the same organic solvent, to which there has now been added the sulfonic acid ion exchanger. Both such extractions are preferably carried out as counter-current extractions in an automatic liquid-liquid extraction apparatus. The first extraction, i.e., with organic solvent alone, should be as thorough as possible, while in the second extraction the load on the liquid ion exchanger as well as the yield of L-dopa should be as high as possible without the extract containing impurities in amounts great enough to retard crystallization of the L-dopa.

The second extraction yields a solution of the sulfonic acid salt of L-dopa in the organic solvent. The L-dopa is liberated from the salt by adding a suitable base which, together with the sulfonic acid, forms a salt that is soluble in the organic solvent. The major portion of the L-dopa is liberated as a crystalline precipitate which is filtered or centrifuged off from the solution. The remaining mother liquor is washed in a liquid-liquid extraction apparatus with an excess of a mineral acid solution, in which the base used for neutralization, as well as the uncrystallized L-dopa dissolve. The thus obtained solution is added to the original aqueous solution. When the mother liquor is washed with a mineral acid after removal of the L-dopa, the sulfonic acid in the organic solvent is liberated from its salt and can be used again for binding L-dopa. The solvent used in the first extraction, i.e., the solvent not having any sulfonic acid, is first washed with an excess of an alkaline solution to remove impurities dissolved therein. It is then washed with water and used again. The organic solvent and the sulfonic acid removed with the waste solution are made up for at some suitable point in the system.

DESCRIPTION OF THE PREFERRED EMBODIMENTS

The invention will now be described in greater detail in conjunction with the drawing.

The starting material is a vegetable extract or other L-dopa-containing solution from which most of the calcium content is removed by precipitation with oxalic acid. The precipitate, together with any turbidity present in the starting material, is filtered off from the solution or removed by centrifuging. The solution is then pumped into a container 1 and stirred therein. Into container 1, there is introduced, by recycle, the aqueous solution obtained when the mother liquor remaining after crystallization of L-dopa is washed with an acid in liquid-liquid contactor 8. Uncrystallized L-dopa and the mineral acid salt of the base which is used for neutralization, remain in the mineral acid-containing wash solution. Sodium hydroxide solution is added to the solution in container 1 to raise the pH of the outflowing solution to 1.0–3.5, preferably 1.5–2.5. Control of the pH is preferably effected automatically with a pH meter. From container 1 the liquid to be extracted flows into liquid-liquid contactor 2, where it is counter-currently extracted with an organic solvent. From contactor 2 the organic solvent flows into a washer 4, where washing with an excess of an alkali solution is continuously effected. Most of the impurities in the organic solvent are removed by the alkali solution and withdrawn as waste.

From washer 4 the organic solvent flows into another washer 5, where it is washed with water. This, too, is a continuous and automatic process. From washer 5 the organic solvent flows into container 6, which is a storage and pumping container, into which make-up organic solvent is introduced when necessary. The flow of alkali solution into washer 4 and of water into washer 5 is effected with the aid of suitable dosing pumps (not shown). The organic solvent is conveyed from container 6 to contactor 2 by pump 7 and the flow rate thereof is adjusted. The aqueous solution flowing out of washers 4 and 5 is saturated with organic solvent, as is the aqueous solution which flows from liquid-liquid contactor 2 to liquid-liquid contactor 3. This aqueous solution still contains L-dopa. The organic solvent circulates continuously through contactor 2, washers 4 and 5, container 6, and pump 7. In liquid-liquid contactor 2 the organic solvent extracts impurities from the aqueous solution flowing into contactor 2, which impurities are removed from the organic solvent in washers 4 and 5, whereafter pump 7 returns the solvent into circulation, with any required make-up being added to container 6.

The extraction of L-dopa from the aqueous solution into the sulfonic acid-containing organic solvent takes place in liquid-liquid contactor 3, into which the aqueous solution flows from contactor 2. The organic solution thus obtained, which contains L-dopa in the form of a sulfonic acid salt, flows into container 9, where stirring is effected and where the acidity of the solution is adjusted to pH 4–5 by addition of a suitable base. The base added to the solution must be one which, together with the sulfonic acid, forms a salt that is soluble in the organic solvent, without causing the water in the solution to separate into a different liquid phase. After this, the liquid is transferred into container 10, a large vessel where it remains for the time required for the crystallization of L-dopa, i.e., 2–4 hours. Container 10 is provided with an immersed filter and a stirrer. In the cone-shaped lower part of the container a tap is provided. Stirring is necessary to accelerate crystallization. The L-dopa is separated from the mother liquor by periodically opening the tap at the bottom of the container, so that the crystalline suspension is let out. The suspension is filtered and the mother liquor returned to container 10. A pump 11 pumps the mother liquor from container 10 through the immersed filter into liquid-liquid contactor 8, where the liquid ion exchanger is regenerated and its content of uncrystallized L-dopa washed back with a mineral acid such as sulfuric or hydrochloric acid of suitable concentration. Besides the L-dopa, the mineral acid extracts from the organic phase, the base used for neutralization in container 9. The wash solution is returned to container 1. The regenerated sulfonic acid solution, to which sulfonic acid has been added, if necessary, returns to liquid-liquid contactor 3. The addition of sulfonic acid makes up for the sulfonic acid removed from the system with the waste solution flowing out of contactor 3.

Liquid-liquid contactors 2, 3 and 8 are of the mixer-settler-box type. They each consist of 10 units with an extraction efficiency of 70–80%. Washers 4 and 5 are separate units of the same type.

In principle, any type of liquid-liquid extractor may be used, provided the extraction efficiency is satisfactory. In each extraction a distribution value of $G=1.2–1.3$ was aimed at with one equilibration, which in a 10-unit apparatus ensures an extraction yield of more than 90%.

The process may be monitored by shaking together in a separatory funnel a sample of the mother liquor, which has been washed with mineral acid and which flows out of contactor 8, and a sample of the aqueous solution flowing out of contactor 2, and measuring the distribution of L-dopa between the liquid phases. If necessary, sulfonic acid may then be added to the organic solvent, so that the capacity for extracting L-dopa remains satisfactory despite the loss of sulfonic acid with the waste solution. If, on the other hand, a lower concentration of sulfonic acid in the liquid ion exchanger is desired, the flow of the ion exchanger in contactor 3 may be increased in relation to the aqueous solution.

EXAMPLE

The starting material was a water extract of the whole vegetative unit of green horse bean plant (*Vicia faba*), obtained according to the method described in copending application Ser. No. 282,909, now abandoned, filed Aug. 23, 1972. The solution contained 75 g of dry substance and 2.4 g of L-dopa per liter. A saturated solution of oxalic acid at 40°–50°C (8 g/l) was added to the solution to precipitate out any calcium contained in the solution. The precipitate was separated from the solution in a filtering centrifuge. At first, sulfuric acid was added to the filtrate to adjust the pH to 1.5. Subsequently, when the L-dopa was crystallized and the mother liquor washed with sulfuric acid, this acid solution was used again by adding it to the vegetable extract after centrifugation of the oxalic acid precipitation, after which the pH of the solution was adjusted to 1.5 by adding the necessary amount of a 70% NaOH solution. The solution thus obtained was extracted with methyl-isobutylketone in liquid-liquid contactor 2, which is a 10-unit mixer-settler-box-type contactor. Each unit has a 5-liter mixing section and a 20-liter settling section. The flow rate of the organic solvent through the apparatus was 120 liters/hr. and that of the aqueous solution 90–120 liters/hr. The methyl-isobutylketone extract, which contained 3.0–3.5 g/l of dry substance was first washed in washer 4 with 2N sodium hydroxide solution, the flow rate of which was 6 liters/hr, then in washer 5 with water at a flow rate of 6 liters/hr. Washers 4 and 5 were each separate units of the extraction apparatus, the mixing part of which had a volume of 5 liters and the settling part a volume of 20 liters. The washed, circulating methyl-isobutylketone contained 0.3–0.4 g of dry substance per liter. Pump 7 is a piston pump, the stroke length and frequency of which can be adjusted so as to give the desired flow rate. This type of pump was used for flow rate adjustment and dosage of all the solutions used in the extraction. The capacity of container 6 was 50 liters.

The extraction of the prewashed aqueous solution with sulfonic acid-containing methyl-isobutylketone was carried out in container 3, which was similar to contactor 2. The methylisobutylketone contained 40–50 g/l of dodecylbenzenesulfonic acid. The flow rate of the aqueous solution was 90–120 liters/hr and that of the liquid ion exchanger was 120 liters/hr. To the first unit of the extraction apparatus, sulfurous acid was added as an antioxidant in the form of an aqueous solution of sodium bisulfite in an amount of about 1 g per liter of solution to be extracted. The methyl-isobutylketone-dodecylbenzenesulfonic acid extract coming from contactor 3 had an average L-dopa content of 3.7 g/l and a dry substance content of 65–75 g/l.

Container 9, where the neutralization took place, had a volume of 25 liters. The neutralization was carried out with gaseous ammonia, which was conducted into the solution from a gas shell. The pH of the solution was kept at 4.5 and was continuously controlled with a pH meter. The liquid volume in the crystallization container 10 was 500 liters, i.e., the liquid remained in this container for about 4 hours on the average. The final product was separated from the mother liquor by periodically opening the tap at the bottom of container 10, to release the crystalline suspension; the precipitate was filtered off, and the mother liquor was returned to container 10. A pump 11 continuously sucked solution through a filter immersed in the container, and pumped it into contactor 8, where the mother liquor was washed with a 2.5N sulfuric acid solution. The mother liquor contained about 2.0 g/l of L-dopa. The volume of the wash solution was ¼ that of the mother liquor. After washing, the sulfuric acid solution contained 5.2 g and the mother liquor 0.5 g of L-dopa per liter. The waste solution from contactor 3 contained per liter, about 0.24 g of L-dopa, 1 g of dodecylbenzenesulfonic acid, and 15 g of methyl-isobutylketone.

The extract used as the starting material contained 2.4 kg of L-dopa per 1000 liters. From this extract there were separated 2.3 kg of a product consisting of 90% L-dopa. In addition to L-dopa, the product contained 3% tyrosine, and less than 1% each of leucine, phenylalanine and aspartic acid; as well as ammonium sulfate, ammonium sulfite, and dodecylbenzenesulfonic acid salt.

Variations can, of course, be made without departing from the spirit and scope of the invention.

Having thus described the invention, what is desired to be secured by Letters Patent and hereby claimed is:

1. A process for the isolation of 3-(3,4-dihydroxyphenyl)-L-alanine from an aqueous solution thereof, said process comprising extracting an aqueous solution of 3-(3,4-dihydroxyphenyl)-L-alanine with a liquid ion exchanger comprising a sulfonic acid selected from the group consisting of alkyl-, aryl- and ester-sulfonic acids dissolved in an organic solvent selected from the group consisting of alcohols, esters and ketones which are insoluble or sparingly soluble in water to bind the 3-(3,4-dihydroxyphenyl)-L-alanine to said sulfonic acid in the form of a sulfonic acid salt, liberating said 3-(3,4-dihydroxyphenyl)-L-alanine from said salt by neutralization with a base that precipitates the 3-(3,4-dihydroxyphenyl)-L-alanine, separating the precipitate from the solution and regenerating the sulfonic acid by treating the solution with a mineral acid, said sulfonic acid being thereafter used in a subsequent extraction.

2. A process according to claim 1, comprising preliminarily treating the starting aqueous solution with oxalic acid to precipitate out any calcium contained therein.

3. A process according to claim 1 wherein the liquid ion exchanger comprises dodecylbenzenesulfonic acid dissolved in methyl-isobutylketone.

4. A process according to claim 1 comprising subjecting the aqueous solution to a first extraction with the organic solvent alone, before extracting same with the liquid ion exchanger.

5. A process according to claim 4 wherein the first extraction of the aqueous solution is a counter-current liquid-liquid extraction.

6. A process according to claim 1 wherein the 3-(3,4-dihydroxyphenyl)-L-alanine is liberated from the sulfonic acid salt thereof by treatment with a base which together with the sulfonic acid forms a salt that is soluble in the organic solvent used.

7. A process according to claim 6 wherein the base is ammonia, hydrazine, an alkylamine or an alkanolamine.

8. A process according to claim 7 wherein the alkylamine is methylamine or ethylamine.

9. A process according to claim 7 wherein the alkanolamine is methanolamine or ethanolamine.

10. A process according to claim 1 wherein the aqueous solution is extracted with the liquid ion exchanger by a counter-current liquid-liquid extraction.

* * * * *

PO-1050
(5/69)

UNITED STATES PATENT OFFICE
CERTIFICATE OF CORRECTION

Patent No. 3,928,431                                   Dated    December 23, 1975

Inventor(s)  THORD BRODERMAN et al

It is certified that error appears in the above-identified patent and that said Letters Patent are hereby corrected as shown below:

Title page, left side, the title: "METHOD OF ISOLATING L-DOPA FROM A AQUEOUS SOLUTION THEREOF" should read -- METHOD OF ISOLATING L-DOPA FROM AN AQUEOUS SOLUTION THEREOF --.

Column 1, line 1: "METHOD OF ISOLATING L-DOPA FROM A" should read -- METHOD OF ISOLATING L-DOPA FROM AN --.

Column 5, line 23: "(8 g/l)" should read -- (3 g/l) --.

Signed and Sealed this

[SEAL]                                          sixteenth Day of March 1976

Attest:

RUTH C. MASON
*Attesting Officer*

C. MARSHALL DANN
*Commissioner of Patents and Trademarks*